United States Patent [19]
Webber

[11] Patent Number: 4,866,240
[45] Date of Patent: Sep. 12, 1989

[54] NOZZLE FOR PLASMA TORCH AND METHOD FOR INTRODUCING POWDER INTO THE PLASMA PLUME OF A PLASMA TORCH

[75] Inventor: Roderick P. Webber, Elkhart, Ind.

[73] Assignee: Stoody Deloro Stellite, Inc., St. Louis, Mo.

[21] Appl. No.: 241,923

[22] Filed: Sep. 8, 1988

[51] Int. Cl.[4] ..................... B23K 9/04

[52] U.S. Cl. ..................... 219/121.47; 219/121.5; 219/121.48; 219/76.16

[58] Field of Search ..................... 219/121.47, 121.59, 219/121.36, 121.5, 121.51, 76.16, 76.15, 75; 239/3

[56] References Cited

U.S. PATENT DOCUMENTS 3,591,759 7/1971 Stand ..................... 219/76.16
3,676,638 7/1972 Stand ..................... 219/76.16
3,914,573 10/1975 Mueblberger ..................... 219/121.47
4,506,136 3/1985 Smyth et al. ..................... 219/121.47
4,672,171 6/1987 Cusimano et al. ..................... 219/76.16

*Primary Examiner*—M. H. Paschall
*Attorney, Agent, or Firm*—Jack Schuman

[57] ABSTRACT

Apparatus and method are disclosed for introducing powder into a stream of plasma generated in a plasma torch such as a plasma transferred arc torch.

The nozzle of the torch has a central base through which the stream of plasma flows, the bore being conically flared immediately adjacent the exit end of the nozzle. Powder is fed through feed bores in the nozzle to the conically flared portion of the central bore and is directed in the form of streams of powder toward the plasma streams at angles to the longitudinal axis of the central bore of between about 45° and about 50°, preferably 50°, with a velocity component in the direction of travel of the plasma stream. The streams of powder are fed sufficiently close to the plasma stream as to avoid spreading of the streams of powder before they reach the plasma stream, but not so close to the plasma stream as would cause plugging of the feed bores in the nozzle.

9 Claims, 1 Drawing Sheet

NOZZLE FOR PLASMA TORCH AND METHOD FOR INTRODUCING POWDER INTO THE PLASMA PLUME OF A PLASMA TORCH

BACKGROUND OF THE INVENTION (1) Field of the Invention

This invention relates broadly to a nozzle for use with a powder-fed plasma torch.

More specifically, this invention relates to an improved high-efficiency nozzle for use with a powder-fed plasma torch, such as a plasma transferred arc torch.

Further, this invention relates to an improved method for feeding powder into the plasma plume of a plasma torch such as a plasma transferred arc torch.

(2) Description of the Prior Art

The plasma transferred arc process for depositing a flow of heat-fusible powdered material on a substrate or workpiece is well known. In such process, an electric arc within a torch strips electrons from a plasma-forming gas, such as argon or helium, thus ionizing the gas and placing it in an energy state higher than that in the gaseous state, resulting in a very high temperature plasma. Heat-fusible powdered materials, such as metals, metallic alloys, metallic oxides and other ceramic materials and carbides, are introduced into the high temperature plasma and are softened or melted therein while being accelerated to high velocities. These softened or melted high velocity particles are then projected or sprayed onto a substrate or workpiece to provide a high purity, high density, strongly bonded coating on the said substrate or workpiece. In this manner, through proper selection of the powdered material, a coating can be provided with properties not inherent in the substrate or workpiece, such as wear resistance or corrosion resistance. For example, cobalt-based alloy powders are used to hardface substrates (i.e., to provide the substrates with a wear-resistant surface).

Various methods and apparatus have heretofore been proposed for introducing the powdered material into the plasma, which methods and apparatus have shortcomings in one way or another.

U.S. Pat. No. 4,672,171 (1987) to Cusimano et al discloses a powder-fed plasma transferred arc torch having a replacable nozzle threaded into the exit end of the torch. Powder is fed through the nozzle into the plasma plume or column through a plurality of passageways inclined at an angle to the longitudinal axis of the nozzle and radially spaced about the central orifice or arc port, which passageways terminate at the flat face of the nozzle spaced some distance away from the said central orifice. Experience has shown that, with this system for feeding powder to the torch, the streams of powder exiting the passageways in the nozzle will, because of the relatively great distance they travel before reaching the plasma plume or column, expand in cross-section (i.e., diffuse, spread out or lose coherency), to such an extent as to result in a loss of ten percent of the powder under normal conditions, representing powder blown off the substrate or workpiece. On smaller substrates or workpieces, the percentage loss of powder will be much higher, because of a smaller target area. The more expensive the powder, the less economical is this arrangement of powder feed. U.S. Pat. No. 4,104,505 (1978) to Rayment et al shows a similar arrangement for feeding powder to plasma generated in a torch. Powder feed lines communicate with the flat exit end of the torch at some distance away from the central bore of the torch.

U.S. Pat. No. Re. 31,018 (1982) to Harrington et al also shows a plasma spray gun in which powder is introduced into the plasma downstream of the exit end of the nozzle. In this patent, the direction of introduction of the powder is perpendicular to the longitudinal axis of the nozzle. It would be expected that some of the powder would be blown away by the plasma and wasted.

U.S. Pat. No. 3,839,618 (1974) to Muehlberger discloses a powder-fed plasma transferred arc apparatus and method wherein the nozzle downstream of the electrode has a constricting throat leading to a flared or diverging bore. Powder is fed into the throat in an upstream direction (relative to the direction of plasma flow) through passageways inclined at an acute angle to the longitudinal axis of the nozzle, toward the electrode, to increase the dwell time of the powder in the plasma thereby to increase the temperature of the powder before it is projected onto the substrate. It would seem that this arrangement could, under certain operating conditions, result in plugging of the throat and powder feed passageways.

U.S. Pat. No. 3,591,759 (1971) to Stand discloses a plasma spray device for depositing heat-fusible powdered material onto a substrate. The powder is introduced into the plasma flow midway between the entrance and exit ends of the torch nozzle through passageways inclined at an angle to the longitudinal axis of the nozzle, immediately downstream of an abrupt expansion in the nozzle inner diameter, in such manner that the powder is carried within the torch, toward the substrate, on the surface of the plasma rather than being injected into the body of the plasma. It would seem that this arrangement likewise could, under certain operating conditions, result in powder adhering to the wall of the bore of the nozzle. Downstream of the exit end of the torch, the plasma and powder carried on the surface thereof converge. The operation of this apparatus is predicated on laminar flow of the plasma upstream of the point of introduction of the powder, and an abrupt change to turbulent flow of the plasma at the point of introduction of the powder. It is said that the abrupt expansion of the nozzle causes a pressure drop drawing the powder into the nozzle and forcing the powder into a revolving path in the nozzle.

U.S. Pat. No. 3,304,402 (1967) to Thorpe discloses a powder-fed plasma spray gun, wherein the powder is fed into the nozzle perpendicularly to the direction of flow of the plasma and upstream of the exit end of the nozzle, so that the powder will travel a substantial distance through the nozzle before leaving the nozzle. Experience has shown that, with this type of powder feed, some of the powders will adhere to the bore of the nozzle. U.S. Pat. No. 3,387,110 (1968) to Wendler et al and U.S. Pat. No. 3,914,573 (1975) to Muehlberger show generally similar arrangements, the powder entering the plasma at an acute angle relative to the direction of flow of the plasma, upstream of the exit end of the nozzle.

Powder-fed plasma torches of general interest are disclosed in U.S. Pat. Nos. 3,803,380 (1974) to Ragaller, 4,125,754 (1978) to Wasserman et al and 4,739,146 (1988) to Lindland et al.

SUMMARY OF THE INVENTION

One of the objects of this invention is to provide improved apparatus and method for feeding powder into the plasma plume of a plasma torch.

Another object of this invention is to provide an improved high efficiency nozzle for use with a powder-fed plasma torch.

A further object of this invention is to provide an improved nozzle for use with a powder-fed plasma torch which improved nozzle reduces powder losses occurring as a result of powder being blown off the substrate during operation.

Yet another object of this invention is to provide an improved nozzle for use with a powder-fed plasma torch which prevents adherence of powder to the bore of the nozzle.

Other and further objects of this invention will become apparent during the course of the following specification and by reference to the accompanying drawing and the appended claims.

Briefly, I have discovered that the foregoing objects insofar as they relate to method may be attained by introducing powder to the plasma plume of a plasma torch from points closely adjacent said plasma plume and immediately at or adjacent the exit or downstream end of the nozzle of the torch at angles to the direction of flow of the plasma plume of between about 45° and about 50°, preferably 50°, the powder having a velocity component in the direction of flow of the plasma plume. Further, I have discovered that the foregoing objects insofar as they relate to apparatus may be attained by providing, for a powder-fed plasma torch, a nozzle having a central cylindrical bore outwardly flared immediately adjacent the exit end thereof, with a plurality of powder feed bores extending through the body of the nozzle and communicating with the flared portion of the central bore, in such manner that powder fed through the bores enters the plasma immediately at or adjacent the exit end of the nozzle. The longitudinal axis of each of the said powder feed bores defines with the longitudinal axis of the central bore of the nozzle an angle of between about 45° and about 50°, preferably 50°.

DESCRIPTION OF THE DRAWING

Referring now to the drawing, in which like numerals represent like parts in the several views.

DESCRIPTION OF THE PREFERRED EMBODIMENT

One type of plasma torch in which the present inventions may be embodied is the well-known plasma transferred arc torch, and the inventions will be described in this embodiment, although they can be embodied equally as well in other types of plasma torches such as the well-known plasma spray torch.

Figure 1:
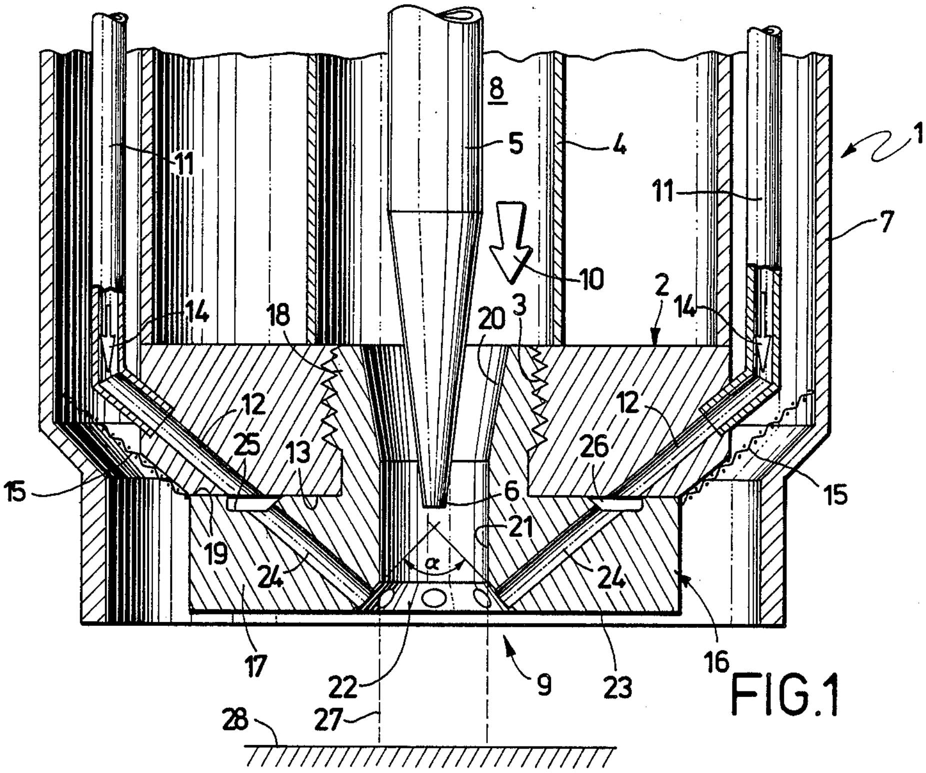
FIG. 1 represents a medial longitudinal section of the exit or downstream end of a typical plasma transferred arc torch showing the nozzle of the present invention threaded into position in the torch.
Figure 2:
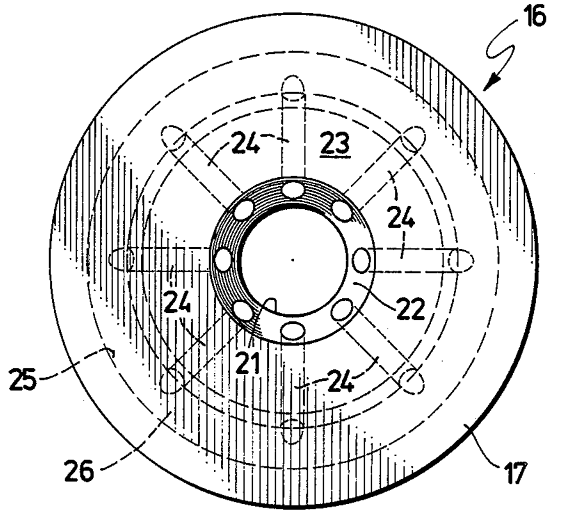
FIG. 2 represents a view in end elevation of the nozzle of the present invention, as seen from its exit or downstream end.

A plasma transferred arc torch 1 (sometimes referred to as a PTA torch), as shown in FIG. 1, typically comprises, among other things, an end piece 2 having a threaded bore 3 extending therethrough and adapted to receive therein a threaded nozzle of one design or another, a longitudinally extending conduit 4, a longitudinally extending circularly cylindrical electrode 5 having a tapered end 6, and a housing 7 extending around and enclosing the PTA torch 1.

The longitudinal axes of threaded bore 3, conduit 4 and electrode 5 are aligned with each other, e.g., they are coaxial.

Conduit 4 and electrode 5 together define an annular passageway 8. When PTA torch 1 is operated, a plasma-forming gas flows through annular passageway 8 toward the exit or downstream end 9 of PTA torch 1, in the direction indicated by arrow 10.

Two or more powder feed tubes 11 extend longitudinally through PTA torch 1 and communicate with powder feed bores 12.

Powder feed bores 12 extend obliquely through end piece 2 to the flat face 13 of said end piece 2 as shown.

When PTA torch 1 is operated, powder having the desired properties is conventionally carried by an inert gas into the upstream ends of powder feed tubes 11 and travels in the direction indicated by arrow 14 through the said powder feed tubes 11 and through the said powder feed bores 12.

A mesh screen 15 extends between and is secured to end piece 2 and housing 7, and serves to distribute shielding gas in the conventional manner.

Electrode 5 and powder feed tubes 11 are suitably supported within PTA torch 1 by means not shown.

PTA torch 1 may include further elements and details, such as appropriate electrical connections, conduits and passageways for cooling liquid and gases. These elements and details have not been shown in FIG. 1, nor are they disclosed in the specification, because they are not necessary to a full and complete understanding of the present invention and to show and describe them might obscure the said invention. These elements and details are, in any event, well known to those familiar with this art.

Nozzle 16 of the present invention, as shown in FIG. 1, is formed with body portion 17 and externally threaded stem 18. Stem 18 is adapted to be threaded into bore 3 of PTA torch 1 until flat face 19 of body portion 17 bears against flat face 13 of end piece 2.

Nozzle 16 is provided with tapered bore 20 communicating with central cylindrical bore 21, and terminates in a conically flared exit bore 22 immediately adjacent exit or downstream face 23 of the said nozzle 16.

Body portion 17 of nozzle 16 is provided with a plurality of radially spaced powder feed bores 24, the longitudinal axes of all of which bores 24 are perpendicular to the surface of conically flared exit bore 22.

The longitudinal axes of powder feed bores 24 all intersect at an angle of between about 90° and about 100°, preferably 100°, and thus define with the longitudinal axis of bore 21 an angle of between about 45° and about 50°, preferably 50°.

Exit bore 22 must be sufficiently deep (i.e., its intersection with cylindrical bore 21 must be sufficiently upstream of the downstream face 23 of nozzle 16) so that all of the downstream ends of powder feed bores 24 (i.e., those ends of powder feed bores 24 which communicate with exit bore 22) are entirely clear of the plasma plume or column 27, to avoid plugging of the said powder feed bores 24 by powder passing therethrough. Exit bore 22, on the other hand, must not be excessively deep, as otherwise powder being projected out of the downstream ends of powder feed bores 24 as powder streams will have to travel so far before reaching plasma plume or column 27 that the powder streams will expand in cross-section (i.e., diffuse, spread out or lose coherency) to such an extent that substantial quantities of powder will be blown off the substrate or workpiece 28. In the preferred embodiment of this invention, exit bore 22 is approximately 0.043 inches in depth (i.e., exit bore 22 and cylindrical bore 21 intersect approximately 0.043 inches upstream of downstream face 23 of nozzle 16.)

When nozzle 16 is mounted in PTA torch 1, by threading stem 18 into bore 3 until flat face 19 bears against flat face 13 of end piece 2, the longitudinal axes of tapered bore 20, cylindrical bore 21 and conically flared exit bore 22 will all be coaxial with the longitudinal axes of bore 3, conduit 4 and electrode 5.

The angle of taper of bore 20 is, preferably, substantially equal to the angle of taper of end 6 of electrode 5.

Conically flared exit bore 22 has an included angle $\alpha$ of between about 80° and about 90°, preferably 80°, and thus defines with the longitudinal axis of bore 21 an angle $\alpha/2$ of between about 40° and about 45°, preferably 40°.

Body portion 17 of nozzle 16 is provided with circular channel 25 extending around flat surface 19. Powder feed bores 24 communicate between channel 25 and conically flared exit bore 22.

When nozzle 16 is mounted in PTA torch 1 as heretofore described, flat face 13 of end piece 2 closes the top of channel 25. Thus, channel 25 and flat face 13 define an annular plenum or chamber 26. When PTA torch 1 is in operation, powder is delivered to said plenum or chamber 26 through powder feed bores 12 and thence through powder feed bores 24 into conically flared exit bore 22.

Because plenum or chamber 26 is annular, extending around face 19, there is no need to register powder feed bores 12 with powder feed bores 24. Whatever the final azimuthal orientation of nozzle 16 when finally mounted in PTA torch 1, powder feed bores 12 will always communicate with, and be capable of delivering powder to, plenum or chamber 26.

In operating PTA torch 1, the flow of plasma-forming gas is commenced, and the arc is struck in the customary manner, thus ionizing the gas and forming a high-temperature plasma column or plume, generally circularly cylindrical in cross-section and indicated diagrammatically by the numeral 27, travelling in the direction of substrate or workpiece 28. At the same time, other conventional operating steps, such as the introduction of cooling water through appropriate conduits in PTA torch 1, are commenced.

Powder, fed through powder feed tubes 11 and powder feed bores 12 into plenum or chamber 26, passes through powder feed bores 24 into the conically flared exit bore 22 and thence as powder streams into plasma plume or column 27, with a velocity component in the direction of flow of said plasma plume or column 27, wherein it is heat-softened or melted prior to being carried by the plasma plume or column 27 to the surface of substrate or workpiece 28 whereon it is then deposited as a coating.

It will be noted that the powder is not introduced into bore 21, within the nozzle 16, as with certain prior art torches, thereby avoiding the problem of adherence of the powder to the wall of bore 21. Such adherence of powder could result in clogging of bore 21 and waste of powder, resulting in low operating efficiency.

Rather, with the nozzle of the present invention, the powder is delivered to the plasma plume or column 27 immediately at or adjacent the exit or downstream end of nozzle 16, with a velocity component in the direction of travel of the plasma plume or column 27. With this disposition of powder feed, there is no possibility of powder adhering to the wall of the bore 21.

Moreover, with the nozzle of the present invention, powder is not projected into the plasma plume or column 27 from points spaced some distance radially outwardly from the central bore of the nozzle as with certain prior art torches. The prior art arrangements result in the powder streams spreading out (i.e., increasing in cross-section or losing coherency) to such an extent, while travelling to the plasma plume or column, that substantial quantities of powder will be blown off the substrate or workpiece 28, resulting in a wasteful operation. In the present invention, powder streams are introduced into plasma plume or column 27 from points closely adjacent the plasma plume or column 27 and immediately at or adjacent the exit or downstream end 23 of nozzle 16, and at an angle to the longitudinal axis of bore 21 ranging between about 45° and about 50°, and preferably 50°. This arrangement permits a substantial reduction in the distance travelled by the powder streams from the downstream ends of powder feed bores 24 to the plasma plume or column 27, and a consequent substantial reduction in the spreading out (i.e., increase in cross-section or loss of coherency) of the powder stream, resulting in very little if any powder being blown off the substrate or workpiece 28. Thus, a more cost-effective operation of the PTA torch 1 is realized.

The inventions disclosed and claimed herein find particular utility in thin-edge welding, where the width of the target may be 0.050 inches or less.

It will be apparent to those skilled in the art to which this invention pertains, after understanding the invention, that various changes and modifications may be made therein without departing from the spirit and scope of the invention as defined by the appended claims.

I claim:

1. A nozzle for use with a powder-fed plasma torch in which a stream of plasma is generated, said nozzle comprising:

(a) an inlet end,
(b) an exit end,
(c) a central bore extending from said inlet end toward said exit end and being adapted to receive said stream of plasma passing therethrough from said inlet end of said nozzle,
(d) a flared exit bore having a narrow end communicating with said central bore and a wide end communicating with said exit end of said nozzle,
(e) said central bore and said flared exit bore having a common longitudinal axis,
(f) said flared exit bore being adapted to receive said stream of plasma from said central bore and to discharge said stream of plasma from said exit end of said nozzle,
(g) a plurality of powder feed bores extending through said nozzle, each of said powder feed bores having an inlet end adapted to receive powder and an exit end communicating with said flared exit bore and adapted to discharge powder,
(h) each of said powder feed bores having a longitudinal axis, each said longitudinal axis forming an angle with the longitudinal axis of said flared exit bore of between about 45° and about 50°,
(i) the exit ends of said powder feed bores being entirely clear of the stream of plasma passing through said flared exit bore, (j) whereby plugging of said exit ends of said powder feed bores by said powder is avoided, and (k) whereby substantial expansion of the cross-sectional areas of streams of powder exiting said exit ends of said powder feed bores and entering said stream of plasma is avoided so as to reduce powder losses.

2. A nozzle as in claim 1, wherein:

(1) the longitudinal axis of each of said powder feed bores forms an angle with the longitudinal axis of said flared exit bore of 50°.

3. A nozzle as in claim 1, wherein:

(1) said flared exit bore is conical.

4. A nozzle as in claim 1, wherein:

(1) the longitudinal axis of each of said powder feed bores is perpendicular to the surfaces of said flared exit bore.

5. A nozzle as in claim 1, wherein:

(1) the depth of said flared exit bore is approximately 0.043 inches.

6. A nozzle for use with a powder-fed plasma torch in which a stream of plasma is generated, said nozzle comprising:

(a) an inlet end, (b) an exit end, (c) a central bore extending from said inlet end toward said exit end and being adapted to receive said stream of plasma passing therethrough from said inlet end of said nozzle, (d) a flared exit bore having a narrow end communicating with said central bore and a wide end communicating with the exit end of said nozzle, (e) said central bore and said flared exit bore having a common longitudinal axis, (f) said flared exit before adapted to receive said stream of plasma from said central bore and to discharge said stream of plasma from said exit end of said nozzle, (g) a plurality of powder feed bores extending through said nozzle, each of said powder feed bores having an inlet end adapted to receive powder and an exit end communicating with said flared exit bore and adapted to discharge powder, said powder feed bores being radially spaced about the longitudinal axis common to said central bore and said flared exit bore, (h) each of said powder feed bores having a longitudinal axis, each said longitudinal axis forming an angle with the longitudinal axis of said flared exit bore of between about 45° and about 50°, (i) the exit ends of said powder feed bores being entirely clear of the stream of plasma passing through said flared exit bore but sufficiently close to said stream of plasma passing through said flared exit bore as to void substantial spreading of streams of powder bearing delivered to said stream of plasma between the time said streams of powder exit said exit ends of said powder feed bores and the time said streams of powder reach said stream of plasma, (j) whereby plugging of said exit ends of said powder feed bores by said powder is avoided, and (k) whereby powder losses are reduced.

7. A nozzle as in claim 6, wherein:

(1) the longitudinal axis of each of said powder feed bores forms an angle with the longitudinal axis of said flared exit bore of 50°.

8. A nozzle as in claim 6, wherein (1) the longitudinal axis of each of said powder feed bores is perpendicular to the surface of said flared exit bore.

9. A method for introducing powder into a stream of plasma passing through a central bore of a plasma torch nozzle having an exit end and powder feed bores extending therethrough, said method comprising:

(a) feeding powder through said powder feed bores to said stream of plasma in the form of powder streams from points entirely clear of said stream of plasma and immediately adjacent the exit end of said central bore of said nozzle, (b) said streams of powder being delivered to said stream of plasma at angles of between about 45° and about 50° to the direction of flow of said stream of plasma and having velocity of components in the direction of flow of said stream of plasma, (c) whereby plugging of the exit ends of said powder feed bores by said powder is avoided, and (d) whereby substantial expansion of the cross-sectional areas of said streams of powder before entering said stream of plasma is avoided so as to reduce powder losses.

10. A method as in claim 9, wherein:

(e) said streams of powder are delivered to said stream of plasma at an angle of 50° to the direction of flow of said stream of plasma.

11. A method as in claim 9, wherein (e) said streams of powder are fed into said stream of plasma from points radially spaced around said central bore.

* * * * *

UNITED STATES PATENT AND TRADEMARK OFFICE
CERTIFICATE OF CORRECTION

PATENT NO. : 4,866,240

DATED : September 12, 1989

INVENTOR(S) : Roderick P. Webber

It is certified that error appears in the above-identified patent and that said Letters Patent is hereby corrected as shown below:

In claim 4, line 3 (column 7, line 17), after "the" delete "surfaces" and substitute therefor -- surface --.

In claim 6, line 15 (column 7, line 37), after "exit" delete "before" and substitute therefor -- bore being --; line 35 (column 8, line 7), before "substantial" delete "void" and substitute therefor -- avoid --; line 36 (column 8, line 8), after "powder" delete "bearing" and substitute therefor -- being --.

In claim 9, line 13 (column 8, line 35), after "velocity" delete "of".

Signed and Sealed this

Seventh Day of August, 1990

*Attest:*

HARRY F. MANBECK, JR.

*Attesting Officer*

*Commissioner of Patents and Trademarks*